United States Patent [19]

Maddaloni

[11] 4,081,751

[45] Mar. 28, 1978

[54] PLUG-IN RADIO SET, AND SUPPORT THEREFOR

[75] Inventor: Ciro Maddaloni, Rome, Italy

[73] Assignee: Voxson S.p.A., Rome, Italy

[21] Appl. No.: 701,048

[22] Filed: Jun. 29, 1976

[30] Foreign Application Priority Data

Jul. 25, 1975 Italy .................................. 50674 A/75

[51] Int. Cl.² ............................................. H04B 1/08
[52] U.S. Cl. .................................. 325/312; 312/7 R; 325/352
[58] Field of Search .............. 312/7 R; 325/361, 312, 325/352, 353, 16, 111, 112, 117, 119, 114

[56] References Cited

U.S. PATENT DOCUMENTS 3,134,945  5/1964  Wertheimer .................. 325/361

Primary Examiner—Robert L. Griffin
Assistant Examiner—Marc E. Bookbinder
Attorney, Agent, or Firm—Beveridge, DeGrandi, Kline & Lunsford

[57] ABSTRACT

A plug-in car radio set, and support therefor comprising a support provided with means for effecting the outer connections, namely antenna, power supply, loudspeaker(s), and the inner connections associated to the radio part proper, including a casing, an indicator for the listening frequency, and the usual controls for volume and tuning, and the electronic circuitry at least at radiofrequency and intermediate frequency.

2 Claims, 2 Drawing Figures

PLUG-IN RADIO SET, AND SUPPORT THEREFOR

The present invention relates to a plug-in radio set, and to the associated mechanical support and electric connection member.

Plug-in car radio sets are known, consisting usually of a set, more or less similar to a conventional car radio set, and of a casing therefor, which is fixed to the motor car.

The purpose of the present invention is that of supplying an arrangement of car radio set and support therefor allowing the drawbacks of the known embodiments to be obviated.

According to the present invention, a support is provided including means for making the outer connections, namely antenna, power supply, loudspeaker, and the inner connections concerned with the radio set proper, including a casing having an indicator of the listening frequency, and the usual controls for the volume and tuning, and the electronic circuitry, at least at radio and intermediate frequency.

Both the radio part and the support part are provided with a multiple connector for the necessary electric connections, and are so shaped that the pluging-in operations of the radio part, into its support can be univocally effected.

Figure 1:
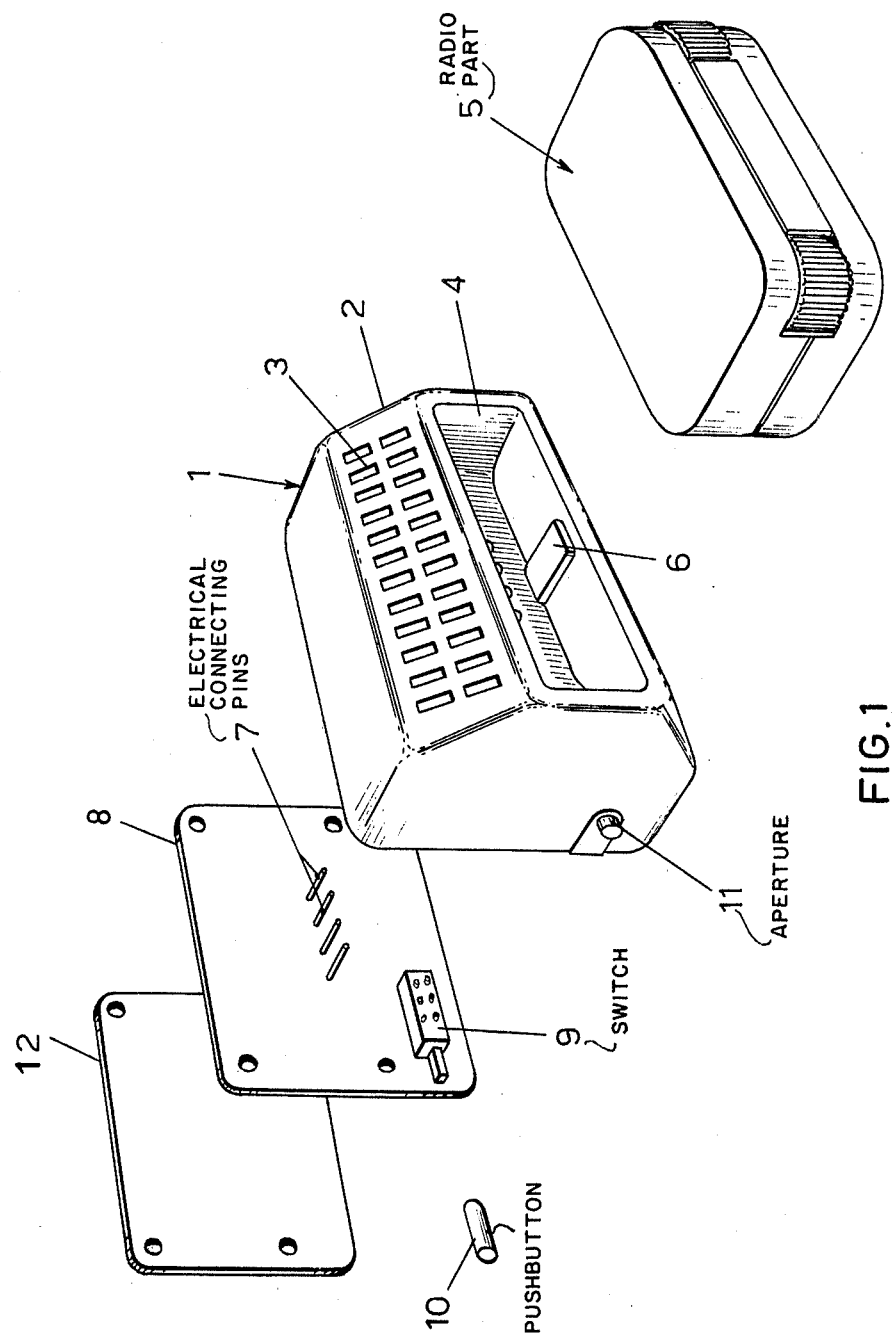
Figure 2:
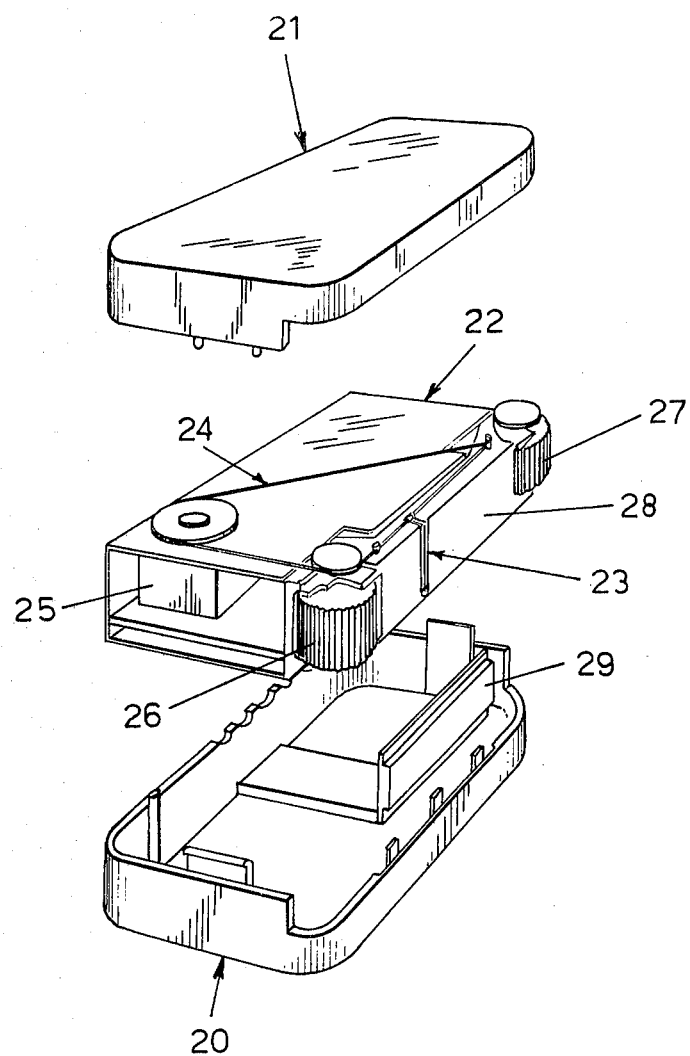

The present invention will be now described with reference to an embodiment as at present preferred, disclosed by way of non limitative example, and in connection with the attached drawings, wherein:

FIG. 1 is an exploded view of the support for the car radio set and of the radio part in its unit, and FIG. 2 is an exploded view of the radio part.

With reference to the drawings, the support according to the present invention, generally denoted by 1, includes a casing 2 provided with an apertured portion 3 for cooling the possible electronic components, a recess 4 destined to contain the radio part denoted by 5 as a unit. In the recess 4 suitably a projecting member 6 is embodied, cooperating with a corresponding cavity (not shown) provided in the radio part 5 in order to prevent erroneous insertions of the radio part 5 into said casing 4. From the rear wall of the recess 4 electrical connection pins 7 project, supported by a base member 8 whereon also a switch 9 is mounted, which can be operated by a push button 10 passing through the aperture 11 of the casing 2.

Behind the base member 8, a plate 12 is mounted carrying the means for the connection to the motor car and the electrical connectors (antenna, feeding, loudspeaker(s)) which have not been shown as they are not essential to the purposes of the technical teaching according to the present invention.

The FIG. 2 shows an exploded view of the radio part denoted by 5 in FIG. 1. Said radio part includes two half-shells 20, 21 substantially complementary with one another, defining a space occupied by the electronics of the radio, as shown generally by 22, including an indicator of the listening frequency 23, movable in a known way by a string 24 operating a tuning element (variable capacitor) 25. The tuning is effected by the knob 26, while the knob 27 operates the potentiometer for controlling the volume. The tuning scale 28 is covered and protected by a transparent element 29. In the radio part a female connector is arranged (not shown) into which the pins 7 enter, as shown in FIG. 1.

The present invention has been described with reference to an embodiment at present preferred, being however understood that variations and modifications might be entered thereinto, without thereby departing from the scope of the present industrial privilege.

Having thus described the present invention, what is claimed is:

1. A car radio set comprising a stationary first radio part and removable second radio part;
   said stationary first radio part being fastened to the car and including a rear plate, a base plate and a front casing;
   said rear plate carrying connection means for connecting said first radio part with an antenna, connection means for connecting said first radio part with a power supply, and connection means for connecting said first radio part with at least one loud-speaker;
   said base plate carrying a plurality of connection plugs and a switch means;
   said front casing having a plurality of openings for receiving said plurality of plugs, a push button arranged to operate said switch means, and a recess adapted to receive said second radio part;
   said removable second radio part including connecting sockets for receiving and making electrical contact with said plugs, electronic radio circuitry, volume and tuning control means and a frequency indicator, whereby said removable second part is rendered operative only when inserted in said recess of said stationary first part.

2. A car radio set according to claim 1 wherein said removable second radio part has no power supply, no antenna and no speaker.

* * * * *